(12) United States Patent
Carlsson (10) Patent No.: US 11,755,000 B2
(45) Date of Patent: Sep. 12, 2023

(54) METHOD OF PROCESS MONITORING IN A MACHINE

(71) Applicant: Tetra Laval Holdings & Finance S.A., Pully (SE)

(72) Inventor: Magnus Carlsson, Kristianstad (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 370 days.

(21) Appl. No.: 16/769,916

(22) PCT Filed: Dec. 4, 2018

(86) PCT No.: PCT/EP2018/083411
§ 371 (c)(1),
(2) Date: Jun. 4, 2020

(87) PCT Pub. No.: WO2019/110546
PCT Pub. Date: Jun. 13, 2019

(65) Prior Publication Data
US 2021/0191370 A1    Jun. 24, 2021

(30) Foreign Application Priority Data
Dec. 7, 2017  (EP) ..................... 17206020

(51) Int. Cl.
*G05B 19/418*  (2006.01)
(52) U.S. Cl.
CPC ............ *G05B 19/4184* (2013.01); *G05B 2219/31479* (2013.01)
(58) Field of Classification Search
CPC ............ G05B 19/4184; G05B 2219/31479
See application file for complete search history.

(56) References Cited

U.S. PATENT DOCUMENTS

| 7,320,103 | B2 | 1/2008 | Filipovic |
| 2002/0118228 | A1* | 8/2002 | Bergo ............... G05B 19/409 715/765 |

(Continued)

FOREIGN PATENT DOCUMENTS

EP    2 903 005 A1    8/2015

OTHER PUBLICATIONS

European Search Report; Application No. 17206020.4; dated Jun. 18, 2018; 8 pages.

(Continued)

*Primary Examiner* — Natalie Huls
*Assistant Examiner* — Sharad Timilsina
(74) *Attorney, Agent, or Firm* — Knobbe, Martens, Olson, & Bear, LLP (57) ABSTRACT

A method is disclosed comprising retrieving captured process data comprising video and/or audio data capturing at least part of the execution of events in a machine, retrieving at least a first signal representing a measurable machine condition responsive to the events executed, wherein a first sequence of said machine control instructions is configured to trigger a respective first set of said events for execution thereof, determining first time stamps of the machine control instructions, aligning the first time stamps with second time stamps determined for at least one of; i) times of execution of said first set of events determined from the captured process data; ii) the first signal and associated measurable machine condition retrieved in response to execution of said first set of events, displaying a representation of the first sequence of machine control instructions, associated with the first time stamps, together with an output representation said second time stamps.

20 Claims, 3 Drawing Sheets

(56) References Cited

U.S. PATENT DOCUMENTS

2006/0048025 A1\* 3/2006 Filipovic ................ G07C 3/005
714/724
2015/0213838 A1\* 7/2015 Dinev .................. G11B 27/031
386/224

OTHER PUBLICATIONS

International Search Report and Written Opinion; Application No. PCT/EP2018/083411; dated Feb. 22, 2019; 10 pages.

\* cited by examiner

METHOD OF PROCESS MONITORING IN A MACHINE

TECHNICAL FIELD

The present invention generally relates to the field of process monitoring. More particularly, the present invention relates to a method of process monitoring in a machine being configured to execute a plurality of events, where the events are associated with respective machine control instructions, and a related system utilized in machines such as filling machines or related apparatuses for producing sealed packages.

BACKGROUND

Root cause analysis is critical in production lines, such as in the manufacturing of sealed packages in a filling machine or related systems, for configuring optimal operating settings and ensuring a desired functionality over a period of time. It is desirable to develop efficient tools and procedures for identification of faulty behavior of machine components and process monitoring of such systems, to avoid disruption of the production line. Since the latest generations of filling machines or related apparatuses employed for the production of sealed packaging containers operate at very high speeds to further increase the throughput of the production line, it has been cumbersome to accurately characterize all aspects of the machine performance during a single operating cycle. This may lead to sub-optimal performance, lowered throughput, and further to increased maintenance costs due to e.g. increased wear of the machine components.

It would this be advantageous with an improved method of process monitoring, and in particular allowing for avoiding more of the above-mentioned problems and compromises, including providing for improved condition monitoring based on multiple sources of data from the monitored process in a machine, and a more efficient method of evaluating control instructions of a machine.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a method of process monitoring in a machine being configured to execute a plurality of events is provided. The events are associated with respective machine control instructions. The method comprises retrieving captured process data comprising video and/or audio data capturing at least part of the execution of the events, retrieving at least a first signal representing a measurable machine condition responsive to the events executed in the process being monitored, wherein a first sequence of said machine control instructions is configured to trigger a respective first set of said events for execution thereof. The method comprises determining first time stamps of the machine control instructions in said sequence when triggering respective events in said first set, with reference to a master clock, and aligning the first time stamps with second time stamps determined with reference to said master clock for at least one of; i) times of execution of said first set of events determined from the captured process data; ii) the first signal and associated measurable machine condition retrieved in response to execution of said first set of events. The method comprises displaying a representation of the first sequence of machine control instructions, associated with the first time stamps, together with an output representation said second time stamps for a synchronous monitoring according to the master clock of the execution of said first set of events, determined from the captured process data, and/or of the first signal.

According to a second aspect a computer program product comprising instructions which, when the program is executed by a computer, cause the computer to carry out the steps of the method according to the first aspect.

According to a third aspect a system is provided for process monitoring in a machine being configured to execute a plurality of events, the events being associated with respective machine control instructions in a controller. The system comprises a recording device configured to retrieve captured process data comprising video and/or audio data capturing at least part of the execution of the events, and to retrieve at least a first signal transmitted by a sensor and representing a measurable machine condition responsive to the events executed in the process being monitored, wherein a first sequence of said machine control instructions is configured to trigger a respective first set of said events for execution thereof. The system comprises a processing unit configured to communicate with the controller and being configured to determine first time stamps of the machine control instructions in said sequence when triggering respective events in said first set, with reference to a master clock, and align the first time stamps with second time stamps determined with reference to said master clock for at least one of; i) times of execution of said first set of events determined from the captured process data; ii) the first signal and associated measurable machine condition retrieved in response to execution of said first set of events. The system comprises a display configured to display a representation of the first sequence of machine control instructions, associated with the first time stamps, together with an output representation of said second time stamps for a synchronous monitoring according to the master clock of the execution of said first set of events, determined from the captured process data, and/or of the first signal.

According to a fourth aspect a packaging- or filling machine is provided comprising a system according to the third aspect.

Further examples of the invention are defined in the dependent claims, wherein features for the second and subsequent aspects of the disclosure are as for the first aspect mutatis mutandis.

Some examples of the disclosure provide for an improved method of process monitoring.

Some examples of the disclosure provide for improved condition monitoring based on multiple sources of data from the monitored process in a machine.

Some examples of the disclosure provide for a more efficient method of evaluating control instructions of a machine.

Some examples of the disclosure provide for facilitated condition monitoring in rapid events executed in a machine.

Some examples of the disclosure provide for facilitated and less time-consuming identification of faulty components or aggregates of components and functionalities in a machine.

Some examples of the disclosure provide for a more efficient use of resources to identify erroneous behavior in a machine.

Some examples of the disclosure provide for a more predictable and efficient maintenance schedule of a machine component.

Some examples of the disclosure provide for less time-consuming trouble-shooting of a machine.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 1A:
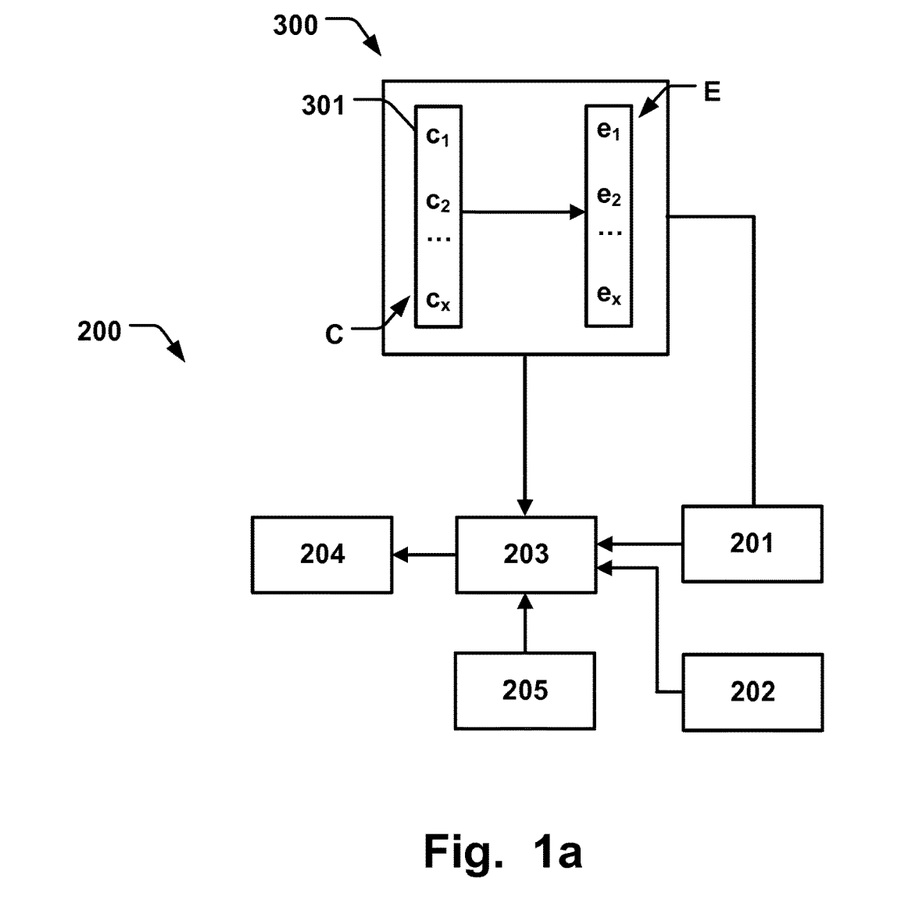
FIG. 1a is a schematic illustration of a system for process monitoring of a machine according to examples of the disclosure.
Figure 1B:
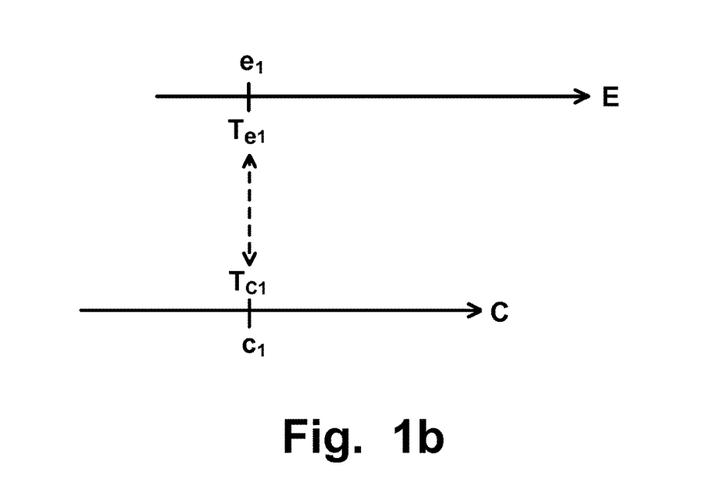
FIG. 1b is a schematic diagram of aligned time lines of a sequence of machine control instructions and a set of events executed in a machine, according to examples of the disclosure; of a system for process monitoring of a machine according to examples of the disclosure.
Figure 2:
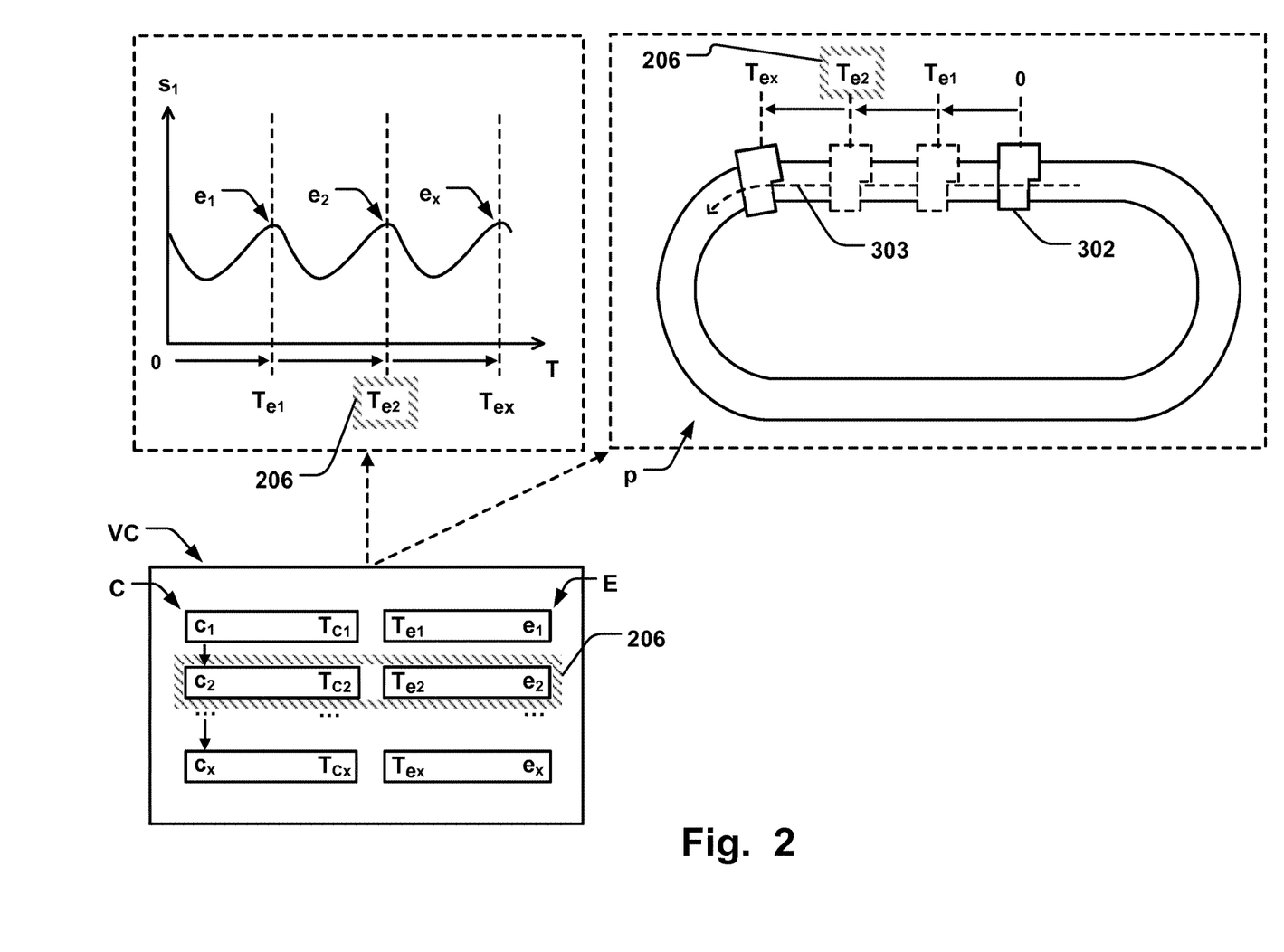
FIG. 2 is a schematic illustration of a representation of a sequence of machine control instructions, and associated captured process data comprising video of the execution of the events executed in the machine, and a first signal representing a measurable machine condition responsive to the events, respectively, according to examples of the disclosure.
Figures 3A, 3B:
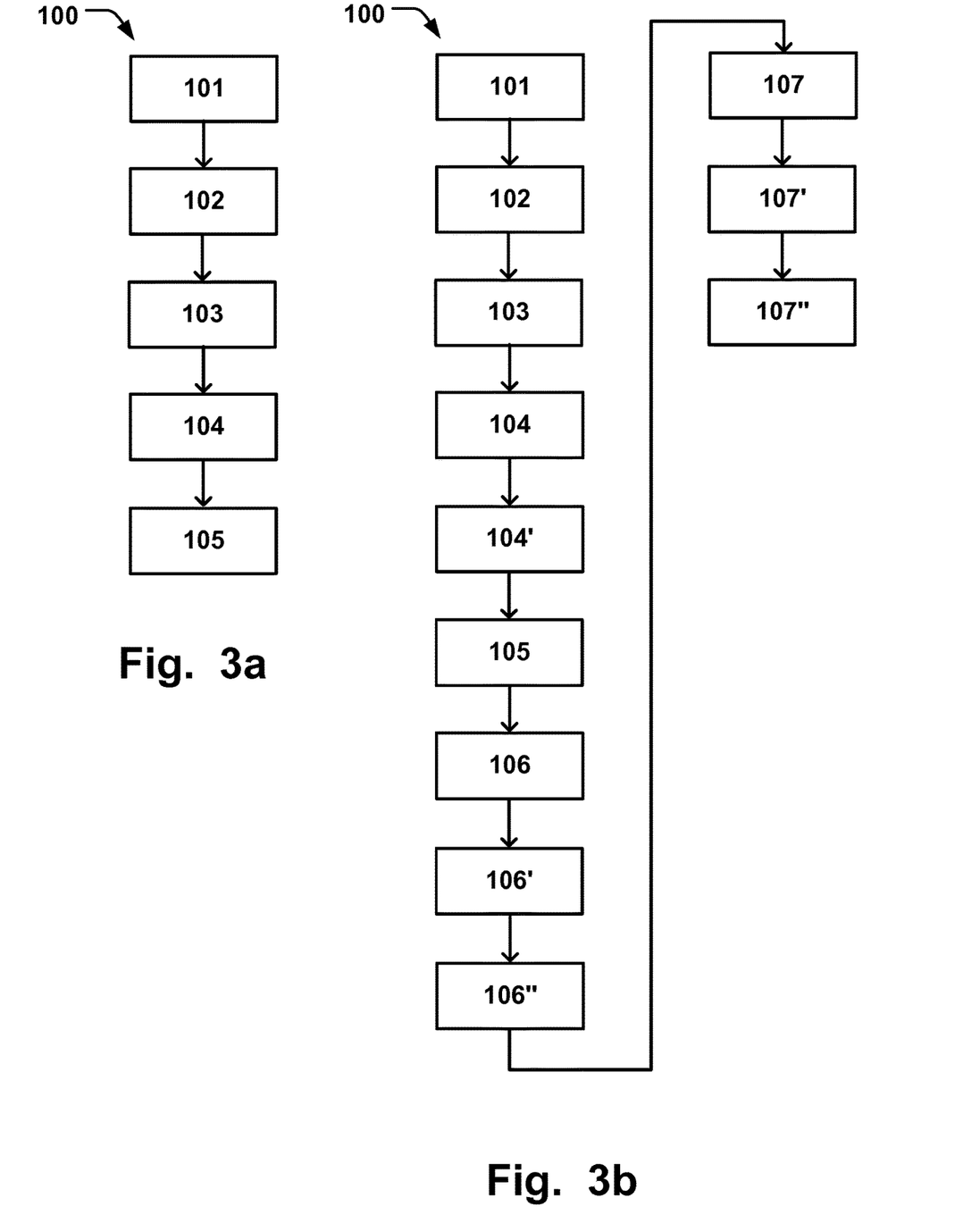
FIG. 3a is a flowchart of a method of process monitoring in a machine being configured to execute a plurality of events, according to examples of the disclosure.
FIG. 3b is a flowchart of a method of process monitoring in a machine being configured to execute a plurality of events, according to examples of the disclosure.

FIG. 1a is a schematic illustration of a system 200 for process monitoring in a machine 300 being configured to execute a plurality of events ($e_1, e_2, \ldots, e_x$). The events ($e_1, e_2, \ldots, e_x$) may be different operating steps in e.g. a filling machine producing sealed packaging containers for food stuffs. The events ($e_1, e_2, \ldots, e_x$) are associated with respective machine control instructions ($c_1, c_2, \ldots, c_x$) in a controller 301 of the machine 300. The machine control instructions ($c_1, c_2, \ldots, c_x$) may comprise instructions for executing the different operating steps, e.g. move a conveyor for the packaging containers a specific distance, executing an inductive sealing operation of a packaging container etc. Reference is also made to a method 100 executed by the system 200, as schematically illustrated in FIGS. 3a-b, and described further below. The system 200 comprises a recording device 201 configured to retrieve 101 captured process data (p). The process data (p) comprises video and/or audio data capturing at least part of the execution of the events ($e_1, e_2, \ldots, e_x$), as schematically illustrated in FIG. 2, where process data (p) is exemplified as a video stream of a moving carts 302 for manipulating packaging containers (not shown). E.g. the events ($e_1, e_2, \ldots, e_x$) may comprise controlling the carts 302 to assume different positions along a path 303 in the machine 300, where moving the cart 302 from position "0" to the positioned indicated as time "$T_{e1}$" may be regarded as the execution of a first event $e_1$, in response to a first control instruction $c_1$. The recording device 201 may comprise any device configured to capture image and/or audio data of the execution of the events, for playback by a user. The recording device 201 is configured to retrieve 102 at least a first signal ($s_1$) transmitted by a sensor 202, which may be arranged in the machine 300. The first signal ($s_1$) comprises a measurable machine condition responsive to the events ($e_1, e_2, \ldots, e_x$) executed in the process being monitored. E.g. the first signal ($s_1$) may comprise the detection of a change in position of a cart 302 when executing a first event $e_1$, in response activating a first machine control instruction $c_1$. FIG. 2 illustrates a schematic representation of the variation of a first signal ($s_1$) as different events ($e_1, e_2, \ldots, e_x$) are executed in the machine 300, at times ($T_{e1}, T_{e2}, \ldots, T_{ex}$), as described further below. A first sequence (C) of machine control instructions ($c_1, c_2, \ldots, c_x$) is configured to trigger a respective first set (E) of said events ($e_1, e_2, \ldots, e_x$) for execution thereof. The sequence (C), and the associated set of events (E) may comprise any number of machine control instructions, that may collectively execute a particular machine function, such as sealing of a packaging container. The system 200 comprises a processing unit 203 configured to communicate with the controller 301, and is further configured to communicate with the recording device 201 and the sensor 202. The processing unit 203 is configured to determine 103 first time stamps ($T_{C1}, T_{C2}, \ldots, T_{Cx}$) of the machine control instructions ($c_1, c_2, \ldots, c_x$) in the sequence (C) when triggering respective events in said first set (E), with reference to a master clock (T). I.e. the points in time, with reference to a master clock (T) for the execution of the machine control instructions ($c_1, c_2, \ldots, c_x$) are determined and recorded. The machine control instructions ($c_1, c_2, \ldots, c_x$) may comprise different steps in an algorithm for controlling the events ($e_1, e_2, \ldots, e_x$) in the machine 300. Hence, time stamps ($T_{C1}, T_{C2}, \ldots, T_{Cx}$) may be registered for the different steps in such algorithm. The processing unit 203 is configured to align 104 the first time stamps ($T_{C1}, T_{C2}, \ldots, T_{Cx}$) with second time stamps ($T_{e1}, T_{e2}, \ldots, T_{ex}$) determined with reference to the master clock (T) for at least one of (i-ii); i) times of execution of the first set (E) of events determined from the captured process data (p); ii) the first signal ($s_1$) and the associated measurable machine condition retrieved in response to execution of said first set (E) of events. Thus, for (i), the second time stamps ($T_{e1}, T_{e2}, \ldots, T_{ex}$) may be determined from the captured video (p) in FIG. 2, e.g. when cart 302 is moved from "0" to a new position in response to the execution of a first event $e_1$, in which the new position is reached at time $T_{e1}$, i.e. the second time stamp $T_{e1}$ is registered for the mentioned first event $e_1$. The first time stamp $T_{c1}$ registered for the triggering of the first control instruction $c_1$, for execution of the first event $e_1$, may thus be aligned with the actual time $T_{e1}$ of when the first event $e_1$ occurs, as observed in the captured video (p) in the example above. This is schematically illustrated also in FIG. 1b, showing a schematic diagram of aligned time lines of a sequence (C) of machine control instructions and a set of events (E) executed in a machine. Alternatively, or in addition, the second time stamps ($T_{e1}$, $T_{e2}$, ..., $T_{ex}$) are determined for the first signal ($s_1$) when detecting the execution of the events ($e_1$, $e_2$, ..., $e_x$). Hence, the first time stamp $T_{c1}$ registered for the triggering of the first control instruction $c_1$, for execution of the first event $e_1$, may be aligned with the actual time $T_{e1}$ of when the first event $e_1$ occurs, as detected by the first signal ($s_1$), e.g. when the sensor 202 detects the cart 302 reaching the position indicated by $T_{e1}$ in FIG. 2 of the example above. The system 200 comprises a display 204, in communication with the processing unit 203, configured to display 105 a representation of the first sequence (C) of machine control instructions, associated with the first time stamps ($T_{C1}$, $T_{C2}$, ..., $T_{Cx}$), together with an output representation of the second time stamps ($T_{e1}$, $T_{e2}$, ..., $T_{ex}$) for a synchronous monitoring according to the master clock (T) of the execution of the first set (E) of events, determined from the captured process data (p), and/or of the first signal ($s_1$). FIG. 2 is a schematic illustration of the mentioned output representation, where the sequence (C) of machine control instructions is displayed together with representations of the captured process data (p) and the measured first signal ($s_1$). Since the first time stamps ($T_{C1}$, $T_{C2}$, ..., $T_{Cx}$) are aligned with the mentioned second time stamps ($T_{e1}$, $T_{e2}$, ..., $T_{ex}$), the execution of the first set (E) of events can be traced by a user in synchronization with the triggering of the respective sequence (C) of machine control instructions. For example, in the case of a synchronous monitoring according to the master clock of the execution of the first set (E) of events, determined from the captured process data (p), the control instruction $c_2$ and associated first time stamp $T_{c2}$ may be aligned with the second time stamp $T_{e2}$ registered for the execution of the second event $e_2$, in response to the triggering of the second machine control instruction $c_2$, so that the captured video (p) show the position of the cart 302 at a time $T_{e2}$ when the user steps to instruction $c_2$ in the sequence (C) (as highlighted by mark 206 in FIG. 2). The user may accordingly move or step through the various first time stamps ($T_{C1}$, $T_{C2}$, ..., $T_{Cx}$) determined for the sequence of instructions (C) of a control algorithm of the machine 300 and simultaneously trace the behavior of the machine 300 in the synchronized video data (p) captured and indexed with the second time stamps ($T_{e1}$, $T_{e2}$, ..., $T_{ex}$).

It is thus possible to accurately trace any erroneous behavior in the machine resulting from the control algorithm sequence. This facilitates and improves the trouble shooting of the machine control algorithm to an extent which has not been possible with previous techniques. I.e. taking into account the control instructions, i.e. the input to the machine as explained above, and not only output sensor data, provides for a significantly improvement in terms of optimizing the control process. The accuracy and timing of the set of events (E) executed in the machine can accordingly be accurately evaluated for the input sequence (C) of machine control instructions due to the synchronous tracing of the aligned first ($T_{C1}$, $T_{C2}$, ..., $T_{Cx}$) and second time stamps ($T_{e1}$, $T_{e2}$, ..., $T_{ex}$), as explained above. This facilitates monitoring of filling and packaging machines 300 operating at high speeds, where accurate timing of a multitude of interrelated machine functions is of outmost importance.

Alternatively, or in addition, the first signal ($s_1$) may be synchronously traced as the user moves incrementally through the sequence (C) of machine control instructions. E.g. selecting the second control instruction $c_2$, and associated first time stamp $T_{c2}$, as highlighted in FIG. 2, may provide for a corresponding indication of the value of the first signal ($s_1$) (e.g. a position of the cart 302) for the resulting execution of the associated second event $e_2$ at time $T_{e2}$, in the diagram of the visual representation of the first signal ($s_1$). An improved condition monitoring based on multiple sources of data from the monitored process in a machine is thus provided, as well as a more efficient method of evaluating control instructions of a machine. A facilitated and less time-consuming identification of faulty components or aggregates of components and functionalities in a machine is thus also provided.

FIG. 3a illustrates a flow chart of a method 100 of process monitoring in a machine 300 being configured to execute a plurality of events (e1, e2, ..., ex). As mentioned, the events are associated with respective machine control instructions ($c_1$, $c_2$, ..., $c_x$). The order in which the steps of the method 100 are described and illustrated should not be construed as limiting and it is conceivable that the steps can be performed in varying order. The method 100 comprises retrieving 101 captured process data (p) comprising video and/or audio data capturing at least part of the execution of the events, retrieving 102 at least a first signal ($s_1$) representing a measurable machine condition responsive to the events executed in the process being monitored. A first sequence (C) of said machine control instructions is configured to trigger a respective first set (E) of said events for execution thereof. The method 100 comprises determining 103 first time stamps ($T_{C1}$, $T_{C2}$, ..., $T_{Cx}$) of the machine control instructions in the sequence (C) when triggering respective events in the first set (E), with reference to a master clock (T). The method 100 comprises aligning 104 the first time stamps with second time stamps ($T_{e1}$, $T_{e2}$, ..., $T_{ex}$) determined with reference to said master clock (T) for at least one of (i-ii); i) times of execution of the first set (E) of events determined from the captured process data; ii) the first signal ($s_1$) and associated measurable machine condition retrieved in response to execution of the first set (E) of events. The method 100 comprises displaying 105 a representation of the first sequence (C) of machine control instructions, associated with the first time stamps ($T_{C1}$, $T_{C2}$, ..., $T_{Cx}$), together with an output representation the second time stamps ($T_{e1}$, $T_{e2}$, ..., $T_{ex}$) for a synchronous monitoring according to the master clock (T) of the execution of the first set (E) of events, determined from the captured process data (p), and/or of the first signal ($s_1$). The method 100 thus provides for the advantageous benefits as described above in relation to the system 200 and FIGS. 1-2.

FIG. 3b illustrates a further flow chart of a method 100 of process monitoring in a machine 300. The order in which the steps of the method 100 are described and illustrated should not be construed as limiting and it is conceivable that the steps can be performed in varying order. The method 100 may comprise aligning 104' the first time stamps with second time stamps ($T_{e1}$, $T_{e2}$, ..., $T_{ex}$) determined with reference to the master clock (T) for; i) the times of execution of the first set (E) of events determined from the captured process data (p), and; ii) the first signal ($s_1$) and associated measurable machine condition retrieved in response to execution of the first set of events (E). Thus, both the process data (p), e.g. the captured video of the execution of the events, and the first signal ($s_1$) may be a simultaneously synchronized with the sequence (C) of control instructions, so that a user may simultaneously observe the machine behavior in the captured video and the machine characteristics represented by the first signal ($s_1$) when selecting different control instructions ($c_1, c_2, \ldots, c_x$) and associated times ($T_{C1}, T_{C2}, \ldots, T_{Cx}$) of the sequence (C) (as illustrated in the visual representation (VC) of the control sequence in FIG. 2). The process monitoring and troubleshooting process may thus be further facilitated, by utilizing data of multiple sources in synchronization with the steps if the control algorithm. Although the example above only discuss a first signal ($s_1$) it should be understood that a plurality of signals of measurable machine characteristics, obtained from various sensor, may be synchronized to the sequence (C) of control instructions, as well as a plurality of captured video and/or audio streams of process data, from different parts of the machine 300.

The representation, displayed in step 105, may hence comprise a visual control representation (VC) of the set (C) of machine control instructions. The method 100 may comprise receiving 106 a user input to select a first machine control instruction $c_1$ in the visual control representation (VC), whereby an associated first time stamp $T_{C1}$ determined for the execution of the first machine control instruction $c_1$ is aligned with a second time stamp $T_{e1}$ determined with reference to the master clock (T) for a first event $e_1$ triggered by the first machine control instruction $c_1$. The method 100 may comprise displaying 107 an output representation of the captured process data (p) of the first event $e_1$ at a time defined by the second time stamp $T_{e1}$ as the user input to select the first machine control instruction $c_1$ is received. This has been exemplified above, with reference to the highlighted part 206 in FIG. 2 in the sequence (C) and in the data (p) (in this case showing the corresponding method for the second control instruction $c_2$, and associated second event $e_2$).

Thus, when e.g. c2 is chosen in the sequence (C), the video (p) moves to a point in time defined by Te2, showing the related position of the cart 302 as the associated second event e2 is executed.

The method 100 may comprise receiving 106' a user input to select a first machine control instruction $c_1$ in the visual control representation, whereby an associated first time stamp $T_{C1}$ determined for the execution of the first machine control instruction $c_1$ is aligned with a second time stamp $T_{e1}$ determined with reference to the master clock (T) for a first event $e_1$ triggered by the first machine control instruction $c_1$. The method 100 may comprise displaying 107' an output representation of the first signal ($s_1$) as retrieved in response to execution of the first event $e_1$ at a time defined by the second time stamp $T_{e1}$ as the user input to select the first machine control instruction $c_1$ is received. I.e. as also indicated by highlighted part 206 in FIG. 2 in the diagram of the first signal ($s_1$) (in this case showing the corresponding method for the second control instruction $c_2$, and associated second event $e_2$).

The method 100 may comprise receiving 106" a sequence of the user input for a scrolling selection amongst the first sequence (C) of machine control instructions in the visual control representation (VC). For each selection of a machine control instruction and an associated first time stamp, the method 100 may comprise displaying 107" an output representation of the captured process data (p), and/or of said first signal ($s_1$), having an associated second time stamp, synchronously with the scrolling selection with reference to the master clock (T). Thus, the user may move backward and forward in time, amongst the time stamps ($T_{C1}, T_{C2}, \ldots, T_{Cx}$) determined for the sequence (C), while simultaneously monitoring the corresponding or resulting status of the machine 300 in the captured video data (p) or in the first signal ($s_1$). A facilitated monitoring in rapid events executed in the machine 300 is thus provided as well as improved evaluation of control instructions in the machine 300 for facilitating optimization of the executed process.

A computer program product is provided comprising instructions which, when the program is executed by a computer, cause the computer to carry out the steps of the method 100 as described above in relation to FIGS. 1-2.

The system 200 may be configured to execute the method 100 as described above with reference to FIGS. 1-3. Thus, the processing unit 203 may be configured to align 104' the first time stamps with second time stamps ($T_{e1}, T_{e2}, \ldots, T_{ex}$) determined with reference to the master clock for; i) times of execution of the first set (E) of events determined from the captured process data (p), and; ii) the first signal ($s_1$) and associated measurable machine condition retrieved in response to execution of the first set (E) of events.

The mentioned representation may comprise a visual control representation (VC) of the set (C) of machine control instructions. The system 200 may comprise a user input device 205 configured to receive a user input to select a first machine control instruction ($c_1$) in the visual control representation (VC). The processing unit 203 may be configured to align an associated first time stamp $T_{C1}$, determined for the execution of the first machine control instruction $c_1$, with a second time stamp $T_{e1}$ determined with reference to the master clock (T) for a first event $e_1$ triggered by the first machine control instruction $c_1$. The display 204 may be configured to display an output representation of the captured process data (p) of the first event at a time defined by the second time stamp $T_{e1}$ as the user input to select the first machine control instruction $c_1$ is received.

The user input device 205 may be configured to receive a sequence of the user input for a scrolling selection amongst the first sequence (C) of machine control instructions in the visual control representation (VC). For each selection of a machine control instruction and an associated first time stamp. The display 204 may be configured to display an output representation of the captured process data (p), and/or of the first signal ($s_1$), having an associated second time stamp, synchronously with the scrolling selection with reference to the master clock (T).

The time separation between the time stamps may be in the range of 10-100 ms. Thus, high-speed processes in the machine 300 may be resolved with sufficient accuracy. The short time separation of the time stamps ($T_{C1}, T_{C2}, \ldots, T_{Cx}$), ($T_{e1}, T_{e2}, \ldots, T_{ex}$), together with the synchronous monitoring realized by the method 100 and system 200 as described above provides for a facilitated optimization of such processes at significantly shorter time scales than what have been possible before.

The measurable machine condition, represented by the first signal $s_1$ in the examples above, may comprise a mechanical characteristic of the machine 300 and/or an electrical characteristic of the machine 300. The captured process data (p) may comprise video data of a movement of the machine 300 when executing the plurality of events.

A packaging- or filling machine 300 is provided comprising a system 200 as described above in relation to FIGS. 1-2. The packaging- or filling machine 300 thus provides for the advantageous benefits as described above for the system 200.

Thus, a packaging- or filling machine 300 is provided, being configured to execute a plurality of events ($e_1, e_2, \ldots, e_x$), where the events are associated with respective machine control instructions ($c_1, c_2, \ldots, c_x$) in a controller 301. The packaging- or filling machine 300 comprises a system 200 for process monitoring thereof. The system 200 comprises a recording device 201 configured to retrieve 101 captured process data (p) comprising video and/or audio data capturing at least part of the execution of the events, and configured to retrieve 102 at least a first signal ($s_1$) transmitted by a sensor 202 and representing a measurable machine condition responsive to the events executed in the process being monitored. A first sequence (C) of the machine control instructions is configured to trigger a respective first set (E) of said events for execution thereof. The system 200 comprises a processing unit 203 configured to communicate with the controller 301 and being configured to determine 103 first time stamps ($T_{C1}, T_{C2}, \ldots, T_{Cx}$) of the machine control instructions in the sequence (C) when triggering respective events in the first set (E), with reference to a master clock. The processing unit 203 is configured to align 104 the first time stamps with second time stamps ($T_{e1}, T_{e2}, \ldots, T_{ex}$) determined with reference to the master clock (T) for at least one of; i) times of execution of the first set (E) of events determined from the captured process data (p); ii) the first signal ($s_1$) and associated measurable machine condition retrieved in response to execution of the first set (E) of events. The system 200 comprises a display 204 configured to display 105 a representation of the first sequence (C) of machine control instructions, associated with the first time stamps, together with an output representation of the second time stamps for a synchronous monitoring according to the master clock of the execution of the first set (E) of events, determined from the captured process data (p), and/or of the first signal ($s_1$).

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of process monitoring in a food packaging machine being configured to execute a plurality of events, the events being associated with respective machine control instructions, the method comprising:
   retrieving captured process data comprising at least one of video or audio data capturing at least part of the execution of the events,
   retrieving at least a first signal representing operation of one or more components of the food packaging machine during production of one or more packaged food containers responsive to the events executed in a process being monitored,
   determining a first sequence of said machine control instructions configured to trigger a respective first set of said events, said machine control instructions, when executed by a controller of the food packaging machine, causing the one or more components of the food packaging machine to execute the events to produce the one or more packaged food containers,
   determining first time stamps of the machine control instructions in said first sequence in response to triggering respective events in said first set, with reference to a master clock,
   determining a chronological sequence of the first time stamps indicating times of execution of the first sequence of said machine control instructions and second time stamps determined with reference to said master clock for at least one of:
      times of execution of said first set of events determined from the captured process data, or
      the first signal and associated measurable machine condition retrieved in response to execution of said first set of events, and
   displaying the chronological sequence for a synchronous monitoring of the first sequence of said machine control instructions and operation of the one or more components of the food packaging machine according to at least one of the master clock of the execution of said first set of events, determined from the captured process data, or of the first signal, wherein alignment of the first and second time stamps indicates correct operation of the one or more components of the food packaging machine to produce the one or more packaged food containers and misalignment of the first and second time stamps indicates an erroneous operation of the one or more components of the food packaging machine due to one or more errors in the first sequence of said machine control instructions,
   wherein detection of the erroneous operation of the one or more components of the food packaging machine due to one or more errors in the first sequence of said machine control instructions results in troubleshooting the machine control instructions and optimizing a control process of the food packaging machine.

2. The method according to claim 1, wherein the second time stamps are determined with reference to said master clock for:
   times of execution of said first set of events determined from the captured process data, and
   the first signal and associated measurable machine condition retrieved in response to execution of said first set of events.

3. The method according to claim 1, wherein the method comprises:
   receiving a user input to select a first machine control instruction, whereby an associated first time stamp determined for the execution of the first machine control instruction is aligned with a second time stamp determined with reference to said master clock for a first event triggered by the first machine control instruction, and
   displaying an output representation of the captured process data of the first event at a time defined by the second time stamp as the user input to select the first machine control instruction is received.

4. The method according to claim 1, wherein the method comprises:
   receiving a user input to select a first machine control instruction, whereby an associated first time stamp determined for the execution of the first machine control instruction is aligned with a second time stamp determined with reference to said master clock for a first event triggered by the first machine control instruction, and
   displaying an output representation of the first signal as retrieved in response to execution of the first event at a time defined by the second time stamp as the user input to select the first machine control instruction is received.

5. The method according to claim 3, comprising:
receiving a sequence of said user input for a scrolling selection amongst the first sequence of machine control instructions, and
displaying at least one of an output representation of said captured process data, or an output representation of said first signal, having an associated second time stamp, synchronously with the scrolling selection with reference to the master clock.

6. A non-transitory storage medium comprising instructions which, when executed by a computer, cause the computer to carry out the method according to claim 1.

7. A system for process monitoring in a food packaging machine being configured to execute a plurality of events, the events being associated with respective machine control instructions in a controller, the system comprising:
a recorder configured to:
retrieve captured process data comprising at least one of video or audio data capturing at least part of the execution of the events, and
retrieve at least a first signal transmitted by a sensor and representing operation of one or more components of the food packaging machine during production of one or more packaged food containers responsive to the events executed in a process being monitored,
a processor configured to communicate with the controller and further configured to:
determine a first sequence of machine control instructions configured to trigger a respective first set of said events, said machine control instructions, when executed by the controller of the food packaging machine, causing the one or more components of the food packaging machine to execute the events to produce the one or more packaged food containers,
determine first time stamps of the machine control instructions in said first sequence in response to triggering respective events in said first set, with reference to a master clock, and
determine a chronological sequence of the first time stamps indicating times of execution of the first sequence of machine control instructions and second time stamps determined with reference to said master clock for at least one of:
times of execution of said first set of events determined from the captured process data, or
the first signal and associated measurable machine condition retrieved in response to execution of said first set of events, and
a display configured to display the chronological sequence for a synchronous monitoring of the first sequence of said machine control instructions and operation of the one or more components of the food packaging machine according to at least one of the master clock of the execution of said first set of events, determined from the captured process data, or of the first signal, wherein alignment of the first and second time stamps indicates correct operation of the one or more components of the food packaging machine to produce the one or more packaged food containers and misalignment of the first and second time stamps indicates an erroneous operation of the one or more components of the food packaging machine due to one or more errors in the first sequence of said machine control instructions,
wherein detection of the erroneous operation of the one or more components of the food packaging machine due to one or more errors in the first sequence of said machine control instructions results in troubleshooting the machine control instructions and optimizing a control process of the food packaging machine.

8. The system according to claim 7, wherein the second time stamps are determined with reference to said master clock for:
times of execution of said first set of events determined from the captured process data, and
the first signal and associated measurable machine condition retrieved in response to execution of said first set of events.

9. The system according to claim 7, wherein the system further comprises:
a user input device configured to receive a user input to select a first machine control instruction,
wherein the processor is configured to align an associated first time stamp, determined for the execution of the first machine control instruction, with a second time stamp determined with reference to said master clock for a first event triggered by the first machine control instruction, and
wherein the display is configured to display an output representation of the captured process data of the first event at a time defined by the second time stamp as the user input to select the first machine control instruction is received.

10. The system according to claim 9, wherein the user input device is configured to receive a sequence of said user input for a scrolling selection amongst the first sequence of machine control instructions, and wherein the display is configured to display an output representation of said captured process data, or an output representation of said first signal, having an associated second time stamp, synchronously with the scrolling selection with reference to the master clock.

11. The system according to claim 7, wherein time separation between at least one of the first or second time stamps is in the range of 10 to 100 ms.

12. The system according to claim 7, wherein the measurable machine condition comprises at least one of a mechanical characteristic of the food packaging machine or an electrical characteristic of the food packaging machine.

13. The system according to claim 7, wherein the captured process data comprises video data of a movement of the one or more components of the food packaging machine in response to executing the plurality of the events.

14. A food packaging machine for packaging or filling comprising the system according to claim 7.

15. A food packaging machine for packaging or filling being configured to execute a plurality of events, the events being associated with respective machine control instructions in a controller, the food packaging machine comprising:
a recorder configured to:
retrieve captured process data comprising at least one of video or audio data capturing at least part of the execution of the events, and
retrieve at least a first signal transmitted by a sensor and representing operation of one or more components of the food packaging machine during production of one or more packaged food containers responsive to the events executed in a process being monitored,
a processor configured to communicate with the controller and being configured to:
determine a first sequence of machine control instructions configured to trigger a respective first set of said events, said machine control instructions, when executed by the controller, causing the one or more components of the food packaging machine to execute the events to produce the one or more packaged food containers, determine first time stamps of the machine control instructions in said first sequence when triggering respective events in said first set, with reference to a master clock, and determine a chronological sequence of the first time stamps indicating times of execution of the first sequence of machine control instructions and second time stamps determined with reference to said master clock for at least one of:
  times of execution of said first set of events determined from the captured process data, or
  the first signal and associated measurable machine condition retrieved in response to execution of said first set of events, and a display configured to display the chronological sequence for a synchronous monitoring of the first sequence of said machine control instructions and operation of the one or more components of the food packaging machine according to at least one of the master clock of the execution of said first set of events, determined from the captured process data, or of the first signal, wherein alignment of the first and second time stamps indicates correct operation of the one or more components of the food packaging machine to produce the one or more packaged food containers and misalignment of the first and second time stamps indicates an erroneous operation of the one or more components of the food packaging machine due to one or more errors in the first sequence of said machine control instructions, wherein detection of the erroneous operation of the one or more components of the food packaging machine due to one or more errors in the first sequence of said machine control instructions results in troubleshooting the machine control instructions and optimizing a control process of the food packaging machine.

16. The food packaging machine according to claim 15, wherein the second time stamps are determined with reference to said master clock for:

times of execution of said first set of events determined from the captured process data, and the first signal and associated measurable machine condition retrieved in response to execution of said first set of events.

17. The food packaging machine according to claim 15, further comprising:

a user input device configured to receive a user input to select a first machine control instruction, wherein the processor is configured to align an associated first time stamp, determined for the execution of the first machine control instruction, with a second time stamp determined with reference to said master clock for a first event triggered by the first machine control instruction, and wherein the display is configured to display an output representation of the captured process data of the first event at a time defined by the second time stamp as the user input to select the first machine control instruction is received.

18. The food packaging machine according to claim 17, wherein the user input device is configured to receive a sequence of said user input for a scrolling selection amongst the first sequence of machine control instructions, and wherein the display is configured to display an output representation of said captured process data, or an output representation of said first signal, having an associated second time stamp, synchronously with the scrolling selection with reference to the master clock.

19. The food packaging machine according to claim 17, wherein the measurable machine condition comprises at least one of a mechanical characteristic of the food packaging machine or an electrical characteristic of the food packaging machine.

20. The food packaging machine according to claim 17, wherein the captured process data comprises video data of a movement of the one or more components of the food packaging machine in response to executing the plurality of the events.

* * * * *